(12) United States Patent
Schwarz

(10) Patent No.: US 8,394,193 B2
(45) Date of Patent: Mar. 12, 2013

(54) HYDRAULIC BINDER AND BINDER MATRICES MADE THEREOF

(76) Inventor: Wolfgang Schwarz, Vienna (AT)

( * ) Notice: Subject to any disclaimer, the term of this patent is extended or adjusted under 35 U.S.C. 154(b) by 97 days.

(21) Appl. No.: 12/846,124

(22) Filed: Jul. 29, 2010

(65) Prior Publication Data

US 2011/0031132 A1 Feb. 10, 2011

Related U.S. Application Data

(60) Provisional application No. 61/232,537, filed on Aug. 10, 2009.

(51) Int. Cl.
*C04B 9/12* (2006.01)
*C04B 28/04* (2006.01)
*C04B 28/12* (2006.01)

(52) U.S. Cl. .................. 106/713; 106/705; 106/709

(58) Field of Classification Search .............. 106/705, 106/709, 713
See application file for complete search history.

(56) References Cited

U.S. PATENT DOCUMENTS

| | | | | |
|---|---|---|---|---|
| 4,640,715 A | | 2/1987 | Heitzmann et al. | |
| 4,642,137 A | | 2/1987 | Heitzmann et al. | |
| 5,284,513 A | * | 2/1994 | Cowan et al. ............. | 106/790 |
| 5,352,509 A | * | 10/1994 | Talling ....................... | 442/327 |
| 5,372,640 A | * | 12/1994 | Schwarz et al. ............. | 106/705 |
| 5,810,922 A | * | 9/1998 | Okamoto et al. ............ | 106/714 |
| 2007/0175750 A1 | | 8/2007 | Schwarz | |

FOREIGN PATENT DOCUMENTS

| | | |
|---|---|---|
| AT | 413 822 B | 6/2006 |
| DE | 3133503 A1 | 3/1983 |
| EP | 0 786 438 A1 | 7/1997 |
| EP | 1 434 486 B1 | 12/2006 |
| SU | 1763404 A1 | 9/1992 |
| WO | 92/04300 A1 | 3/1992 |
| WO | 99/46218 A2 | 9/1999 |
| WO | 00/46422 A2 | 8/2000 |
| WO | 2006/012660 A2 | 2/2006 |

OTHER PUBLICATIONS

Glukhovskii V.D. et al; "Binder Compsn-contains steel melting slag, water glass and aq. Soln. Of potassium bromide and sodium or potassium iodide", Database WPI Week 199337, Thomson Scientific, London, GB; AN 1993-294379, XP002562092.
"Projektfolder Verlangerun der Nutzdauer von Stahlbetonbauten mittels kathodischem Korrosionsschutz (KKS)", mit Copyright 2007, aus_http://www.cas-composite.com/CAS_Projektfolder_38seiten_de.pdf.

* cited by examiner

*Primary Examiner* — Bruce Bell
(74) *Attorney, Agent, or Firm* — Ladas & Parry LLP

(57) ABSTRACT

The invention relates to a hydraulic binder, comprising K, Ca, aluminosilicates, as well as optionally Li, Na, and Mg, wherein the binder comprises the following components: a) a latently hydraulic aluminosilicate glass with a ratio of $(CaO+MgO+Al_2O_3)/SiO_2 > 1$ and b) an alkali activator of the empirical formula (I)

$$a(M_2O) * x(SiO_2) * y(H_2O) \qquad (I)$$

wherein M=Li, Na, K, a=0-4, and x=0-5 and y=3-20, wherein the molar ratio of Ca/Si is <1, the molar ratio of Al/Si is <1, and the molar ratio of M/Si is >0.1. Furthermore, it relates to binder matrices, mortars, concrete adhesives, and metal anodes made of such binder.

35 Claims, No Drawings

HYDRAULIC BINDER AND BINDER MATRICES MADE THEREOF

The invention relates to a hydraulic binder, especially for protecting steel against corrosion, as well as binder matrices, mortars, concrete adhesives and anodes produced by use thereof.

BACKGROUND OF THE INVENTION

Hydraulically setting inorganic binders based on calcium and aluminum silicates have been known for a long time and are used in various compositions and with various properties; see, for example, main class C04 of the International Patent Classification.

Conventional hydraulic binders, e.g. Portland cement, hydraulic limes and calcium aluminate cements, harden to become brittle materials such as mortar and concrete, having high elastic moduli compared to their strengths. Furthermore, conventional hydraulic binders are characterized by a high content of calcium and a high ratio of calcium/silicon, and their strengths are determined by sufficient quantities of dissolved calcium in the pore solution. If the dissolved calcium is washed out of the binder matrix or is immobilized by carbonization, this may lead to a disintegration of the strength-forming mineral phases, i.e. calcium silicate hydrates. Consequently, the durability of binders based on calcium silicates is limited.

Furthermore, galvanic corrosion protection (GCP) has been used for many years for protecting steel in concrete and steel constructions, tubings etc. against corrosion, as described in AT A 1344/2004, EP 1,135,538, EP 668,373, and U.S. Pat. No. 4,506,485. The effect of GCP is based on the formation of a galvanic element between a sacrificial anode and the steel. If galvanic protection is used for protecting steel reinforcements in concrete, the concrete acts as an electrolyte. For protecting steel constructions, usually a gel-like flexible electrolyte is applied between steel and galvanic anode.

For the most part, the gel-like flexible electrolyte is present as an adhesive layer on a metal anode. As the anode material, usually zinc and its alloys, more rarely aluminum and its alloys are used. The anode is usually mounted on the surface of the construction element to be protected, in some cases it is introduced as "discrete galvanic anode" into concrete.

Disadvantages of the known sacrificial anodes in the protection of steel, especially reinforced concrete, against corrosion are that zinc passivates in contact with calcium ions, especially calcium hydroxide, and is inactivated after a short period. Known sacrificial anodes such as zinc applied to a concrete surface by means of a plasma spray method according to the Grillo KKS method (WO 2005/03061) are thus only effective at high humidity and high chloride contents. Once the system has dried out, the zinc passivates irreversibly. In order to avoid these disadvantages, so-called discrete anodes, as described in U.S. Pat. No. 6,572,760 (B2), have been developed. The problem of zinc passivation was solved by adding alkalis, usually alkali hydroxide, to the binder in which the zinc is embedded. Practice has shown that a pH of approximately 14 is required for sufficient activation of the zinc anodes. Thus, these discrete anodes may only be used on construction sites with substantial safety measures, as they are commonly used for highly alkaline corrosive construction materials. In addition, it has been shown that, in the medium term, alkalinity is reduced by galvanic reactions and that zinc passivates, especially in construction elements being exposed to dry-wet cycles. Furthermore, alkalis in concrete may have negative effects on the concrete's strength due to the alkali-silica reaction.

Against this background, it was the object of the invention to provide a hydraulic binder as well as a sacrificial anode made thereof with which the above disadvantages can be largely or entirely overcome.

SUMMARY OF THE INVENTION

In a first aspect, the present invention achieves this object by providing a hydraulic binder, comprising K, Ca, aluminosilicates, as well as optionally Li, Na, and Mg, characterized in that it comprises the following components:

a) a latently hydraulic aluminosilicate glass having a ratio of

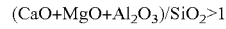
$$(CaO+MgO+Al_2O_3)/SiO_2 > 1$$

and b) an alkali activator of the empirical formula (I)

$$a(M_2O) * x(SiO_2) * y(H_2O) \tag{I}$$

wherein M=Li, Na, K, a=0-4, and x=0-5 and y=3-20,
wherein the molar ratio of Ca/Si is <1, the molar ratio of Al/Si is <1, and the molar ratio of M/Si is >0.1.

This simplest embodiment already shows the following advantages compared to the prior art: The inventive binder is predominantly characterized by a very high elasticity and a high strength. Conventional mortars and concretes of hydraulic binders have compressive strengths of 18 to 24 GPa at elastic moduli of 15 to 25 MPa, which may be calculated using the well-known formula (I) according to the American Concrete Institute ACI 318-95 and ACI 318-89:

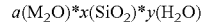
$$Ec = 4.73(f'_c)^{0.5} \tag{I}$$

wherein:
Ec=elastic modulus in GPa
$f'_c$=compressive strength in MPa.

For concretes of the strength class 16/20 MPa, according to ÖNORM 4700 an elastic modulus of 27 GPa is characteristic.

In contrast to the tectoaluminosilicate cement described in AT 177,072 T, DE 59109105 D and U.S. Pat. No. 5,372,640, the inventive binder does not use microsilica. The inventive binder is hard and elastic and deformable under pressure—and that with high strengths. It is thus especially suitable for the manufacture of thin sheets and tiles and for the manufacture of coatings on concrete and metal. For both application purposes, high elasticity and increased creep have great advantages.

An inventive binder matrix also has the special characteristic that it is made of two components that are both alkaline (e.g. component A: pH 10.35, component B: pH 13.94, mixture of A+B: pH 13.21). Directly after mixing and before hardening, the pH value is 13.21, after hardening the pH value is 10.48. The hardened binder matrix is thus clearly different from hardened binders according to prior art, such as Portland cement: pH 13.6; Roman cement: pH 13.1; hydraulic lime: pH 12.6.

The latently hydraulic aluminosilicate glass (LHASG) in the inventive hydraulic binder is a material that—especially in grounded state or powder state—is able to react with calcium hydroxide and to harden, i.e. become "hydraulically active", once it has been activated by an activator. Preferably, blast-furnace slag is used for this purpose, but other slags from other processes, e.g. from other smelting processes, melting processes in which a slag-like material is formed, such as steel slags, melting-chamber fly ashes or fly ashes from coal power plants with high glass contents, or any amorphous, glass-like material that is hydraulically active and corresponds to the above empirical formula may also be used.

Generally, the alkali activator is substantially an alkali water glass, e.g. sodium or potassium silicate. By means of the alkali activator of component b), the latently hydraulic component a) is activated. In preferred embodiments, the alkali activator contains at least one alkali hydroxide, which increases its effect, i.e. higher reaction rate in setting and higher strengths of the hardened products. Especially good results were achieved with a potash water glass that contained 10-12% by weight of $K_2O$ and 20-25% by weight of $SiO_2$, and to which 10-15% by weight of potassium hydroxide were added.

Preferably, the inventive binder additionally contains, as a component c), a latently hydraulic additive, e.g. a pozzolan, even more preferably a low-calcium, especially a calcium-free, latently hydraulic aluminosilicate, in order to improve properties such as strength and density, since it optionally binds dissolved calcium in the pore solution of a binder matrix, thus causes 3-dimensional cross-linking of the matrix, and reduces the content of soluble calcium hydroxide. Especially preferred, the latently hydraulic aluminosilicate consists of either a natural pozzolan, e.g. volcanic ash or pulverized volcanic tuff, or an artificial pozzolan, e.g. a thermically activated clay mineral, e.g. calcined between 500° C. and 900° C., since these materials are readily available and inexpensive. Furthermore, artificial pozzolans are very active, latently hydraulic aluminosilicates, and calcined clay minerals have the advantage that they have, in contrast to natural pozzolans, a defined composition and thus controllable reactivity. Suitable latently hydraulic aluminosilicates also comprise latently hydraulic fly ashes from coal power plants with a CaO content of <12% by weight, preferably <8% by weight. Vitrified hard-coal fly ashes have also proven to be especially suitable. Generally, "low-calcium latently hydraulic aluminosilicate" herein means a CaO content of <15% by weight, especially <10% by weight.

Metakaolin, prepared from kaolin by calcination at approximately 600° C., has proven to be especially latently hydraulically active. A test for its latent hydraulicity resulted in a solubility of 20% by weight in 1 N NaOH. The addition of latently hydraulic aluminosilicates has also proven advantageous for the mechanical properties of the binder matrix: Their addition results in an increase in elasticity, creep and long-time strength (>28 days).

Aluminosilicate and aluminosilicate glass are said to be latently hydraulic when of 2 g, dispersed in 100 ml of 60° C. warm 1 N caustic soda solution, at least 2% by weight are dissolved within 1 hour. This test serves for determining latent hydraulicity.

The quantitative ratios of components a), b) and optionally c) are preferably as follows:
  a) 100-300 parts by weight of latently hydraulic aluminosilicate glass;
  b) 20-150 parts by weight of an alkali activator; and
  c) optionally 50-200 parts by weight of a latently hydraulic additive; wherein the molar ratio of Al/Si is <0.8, and the molar ratio of Ca/Si is <0.9.

Laboratory and practical tests gave the best results within these ratios, as will also be seen in the exemplary embodiments below. The ratio of alkali activator to hydraulic aluminosilicate glass is preferably such that at least 95%, preferably 99%, of the alkali activator are used up during the hardening reaction. It has been shown that optimal results may be achieved with the quantitative ratios described above, wherein the addition of the latently hydraulic additive requires an increase of the amount of the alkali activator in order to achieve optimal results. The ratio $M_2O/(SiO_2+Al_2O_3)$ should be at least >0.01, preferable >0.05. Properties such as durability, elasticity and strength increase with a decrease of the Ca/Si ratio, wherein the Ca/Si ratio should preferably be <0.9. Furthermore, it has been shown that binders in which the molar ratio Al/Si is <1, especially <0.8, result in especially good properties.

The inventive binder may in certain embodiments additionally contain at least one organic polymer, which, when it is used as a concrete coating, reduces the cracking tendency, decreases the elastic modulus, and improves its workability. Preferably, the organic polymer is selected from polyacrylates, latex, polyacryl copolymers, polystyrene copolymers and polystyrene butadiens.

Furthermore, the hydraulic binder of the invention preferably contains a soluble zinc salt, even more preferably a zinc sulfate hydrate, since zinc salts, especially zinc sulfate, serve as setting regulators by means of which the setting times may be regulated. In addition, zinc is effective against algae and fungal attack. For example, the addition of 0.5% by weight of zinc sulfate heptahydrate already increased the setting time by approximately 0.5-1 hour to 12 to 24 hours, without negatively affecting the mechanical properties.

In preferred embodiments, the hydraulic binder additionally contains a lithium salt, preferably a lithium chloride, since these salts also increase the galvanic activity of zinc anodes produced by use of the binder, support the formation of especially durable and cross-linked aluminosilicates during the binder's hardening, and prevent or at least reduce alkali-silica reactions with reactive aggregates, such as opal or greywacke sands. For increasing the performance of zinc anodes, the addition of lithium chloride, e.g. the addition of 0.1 to 2.0% by weight of LiCl, has proven especially advantageous with regard to the stability of the galvanic current. For the ionic conductivity of the inventive binder matrix, on the other hand, the addition of approximately 0.2 to 5.0% by weight, preferably approximately 0.4 to 1.0% by weight, of lithium salts led to good results.

Also with regard to anodes produced by use of the inventive binder, the binder preferably additionally comprises a zinc complexing agent, more preferably a polyethylene imine or polyamide. Zinc complexing agents prevent the passivation of zinc anodes in weakly to moderately alkaline environments. Especially polyethylene imine durably increased the galvanic performance of a zinc anode. Without the addition of polyethylene imine, the zinc anode's current delivery decreased by 90% after one year. The addition of 1-3% by weight, preferably 2% by weight, of polyethylene imine resulted in a decrease of the galvanic current by only 45%, which remained stable in the further course. By using plastics as complexing agents, the advantageous effects of the above organic polymers can be achieved at the same time, and cationic, basic polymers such as polyethylene imine furthermore increase the reactivity of the slag, have a positive effect on the development of strength, and prevent or reduce crack formation in mortars made of the inventive binder.

Furthermore, in preferred embodiments, the inventive hydraulic binder may comprise a thickening agent and/or and thixotroping agent, preferably a cellulose alkyl ether and/or a starch alkyl ether. These increase the workability of mortars made of the binder: The mortar can be applied more easily because it is "smearier" or thixotropic, i.e. it is less viscous or even liquid when applied, however, thickens and gelates in the state of rest. In addition, cellulose alkyl ether and starch alkyl ether act as water retention agents and thus increase ion conductivity.

In further embodiments, the latently hydraulic aluminosilicate glass as the component b) is mixed with hydrogen peroxide in order to oxidize sulfides in the aluminosilicate glass powder and thus convert them into sulfates. The sulfides contained in some aluminosilicate glasses, especially in blast-furnace slag, have proven very detrimental for the zinc anode's effectiveness. Surprisingly, it has been shown that the sulfides could be oxidized easily by merely mixing the ground aluminosilicate glass with a 3% hydrogen peroxide solution.

The components a) and b)—and optionally also c)—of the inventive hydraulic binder can preferably also be provided separately, so that the binder is a two-component system, wherein the alkali activator is preferably dissolved in water and the aluminosilicate glass (optionally together with the additive) is provided as a powder or also already in water, i.e. in liquid form, and the content of the alkali activator and alkali hydroxides optionally contained therein is between 10 and 50% by weight.

The advantage of this embodiment is that the two components of the two-component system can be mixed and converted into a binder matrix more easily and quickly, e.g. directly at a construction site, than when both components are provided in dry forms. In a dry, powdery one-component system, the alkali activator must be provided in a dry, but soluble form and then be dissolved by the addition of water before it may become active.

In a further aspect, the invention is related to a binder matrix produced by use of a hydraulic binder according to the first aspect, which binder matrix is obtained by mixing and reacting the hydraulic binder—in this case a dry one-component system—with water. Preferably, in such a binder matrix, the hydraulic binder is mixed with water in a ratio of 1:0.5 to 1:4, based on the dry substance of the binder. Preferably, the binder matrix has a ratio of $CaO/(SiO_2+Al_2O_3)$ of <0.9, preferably <0.5, a ratio of $CaO/SiO_2$ of <0.9, preferably <0.5, and a ratio of $M_2O/(SiO_2+Al_2O_3)$ of >0.01, preferably >0.05. Alternatively, the binder matrix preferably has a ratio of $CaO/(SiO_2+Al_2O_3)$ of <0.5, preferably <0.3, a ratio of $CaO/SiO_2$ of <0.8, preferably <0.5, and a ratio of $M_2O/(SiO_2+Al_2O_3)$ of >0.02, preferably >0.07.

A binder matrix with the first ratios has high durability, high adhesion (>1.5 MPa) to the support, as well as compressive strengths in the range of 10 to 35 MPa; a binder matrix with the ratios as in the second case is especially suited for applications that require very high durability, high strengths (25 to 75 MPa), and high adhesive tensile strengths (>2.5 MPa after 28 days) with comparably low elastic moduli.

Basically, it may be stated that thin slabs of brittle material, e.g. of Portland cement concrete, have a cracking tendency already during the concrete's hardening in the slabs' manufacture due to their inner tensile stresses that are caused by the concrete's natural vibrations. If such slabs are mechanically fixed to the support, the cracking tendency is further increased by a low creep value. In a smaller extent, the same is true for coatings on concrete and steel. The coating material must be able to adapt to deformations of the concrete or steel support, e.g. due to temperature changes or temperature gradients, without cracking. Slabs, tiles and coatings on concrete and steel produced of mortar containing an inventive binder matrix do, even with high loads, show no cracking, detachment from the support or pop-outs.

In a third aspect, the invention thus provides a mortar obtained by use of i) a hydraulic binder according to the first aspect, ii) water and iii) aggregates, by means of which mortar the above advantages of the invention can be effective in practical use. Mortar made of the inventive binder is especially suitable for the production of concrete coatings and for coatings on steel, for the production of very stable and durable slabs and tiles, as well as for the production of galvanic zinc anodes.

Suitable aggregates are basically all common standard aggregates. Especially good results, however, were achieved with calcitic aggregates and with aggregates of quartz sand. However, the aggregates must be alkali-resistant, particularly they must not be alkali-silica reactive. The grain-size distribution should preferably correspond to the Fuller curve, i.e. the maximum density sphere packing. For a plaster mortar, very good results were achieved with an aggregate of grounded marble with a minimum grain size of 0.2 mm and a maximum grain size of 0.5 mm.

Mortars made of the inventive binder have very low elastic moduli: At compressive strengths of 15-25 MPa, elastic moduli of approximately 12 to 15 GPa are measured. With a mortar made of the inventive binder consisting of 100-300 parts by weight of a latently hydraulic aluminosilicate glass, b) 20-150 parts by weight of an alkali activator, and c) 50-200 parts by weight of a latent hydraulic additive, wherein the molar ratio of Al/Si is <8 and the molar ratio of Ca/Si is <9, an elastic modulus of 7 GPa was measured at a compressive strength of 20 MPa. With a mortar made of the inventive binder with additional alkali hydroxide in the alkali activator, an elastic modulus of 5 GPa was measured. Low elastic moduli means high elasticity.

Furthermore, mortars made of the inventive binder show a good creep behavior. This means that the hardened mortar is deformable under pressure. With mortar prisms made of the inventive binder, a creep value of approximately 0.45 mm/m was measured; with mortar prisms made of an inventive binder with the above weight ratios, a creep value of 0.54 mm/m was measured; and with mortar prisms made of an inventive binder with zinc salt, a creep value of 0.35 was measured. For conventional mortars and concretes, however, creep values of only <0.2 mm/m are characteristic.

Preferred is, for example, a mortar with a ratio of aggregates/binder of 1:0.25 to 1:4 and a ratio of binder/water of 0.25:1 to 2:1. The inventor has found that such a mortar:
  sets after 5 minutes to 24 hours;
  has, 4 hours after setting, stored at 20° C., an adhesive tensile strength on concrete of approximately 0.5 to 3 MPa;
  has, 24 hours after setting, stored at 20° C., an adhesive tensile strength on concrete of approximately 1.0 to 4 MPa;
  has, 28 hours after setting, stored at 20° C., an adhesive tensile strength on concrete of approximately 1.5 to 5 MPa;
  has, 4 hours after setting, stored at 20° C., a compressive strength of approximately 1 to 3 MPa;
  has, 24 hours after setting, stored at 20° C., a compressive strength of approximately 2 to 12 MPa;
  has, 28 hours after setting, stored at 20° C., a compressive strength of approximately 10 to 30 MPa.

Partly, these results are considerable improvements compared to the state of the art. For example, adhesive tensile strengths of conventional mortars are approximately 0.5 to 1 MPa after 24 h and 1.5 to 2.5 MPa after 28 days.

In a further preferred embodiment, an inventive mortar has a ratio aggregates/binders of 1:0.5 to 1:2 and a ratio binder/water of 0.25:1 to 2:1, which results in a dynamic elastic modulus of hardened mortars of <15 GPa, sometimes even <10 GPa, and thus obviously increased elasticity.

Another preferred mortar of the present invention has a ratio of aggregates/binder of 1:0.2 to 1:5 and a ratio of binder/ water of 0.3:1 to 2.5:1 and is thus especially suitable for the production of a metal anode, e.g. a zinc anode, i.e. for embedding a zinc grid, zinc net, zinc punched plate or zinc wires. Such a preferred mortar is especially suitable for the production of active and, above all, permanently active zinc anodes because the zinc anode also remains active with relatively low prevalent pH values (i.e. pH<12, preferably pH<11). Usually, a zinc anode only remains active at pH values of >13, preferably >14. A great advantage of the binder and the mortar made thereof is that, after an inactive phase due to desiccation, the zinc anode becomes active again immediately after remoisturing. The zinc anode's life is thus increased, since during dry phases (RH<60%) the steel to be protected does not corrode and thus the zinc anode is not required. When moisture re-enters, the zinc anode becomes active again, i.e. it is only active when it is really required.

In a further aspect, the invention provides a concrete adhesive that was produced by use of an inventive hydraulic binder, an inventive binder matrix or an inventive mortar. Due to its high ion conductivity, the inventive concrete adhesive is especially suitable for bonding slabs, tiles, metal parts, concrete and mortar precast units to concrete surfaces, e.g. of plate-like metal anodes to concrete.

In a further aspect, the invention comprises the use of an inventive hydraulic binder, an inventive binder matrix or an inventive mortar for producing metal anodes, i.e. sacrificial anodes, for galvanic corrosion protection of steel, preferably of steel in reinforced concrete.

For this purpose, a metal having a more negative standard potential than iron in the electrochemical series, or an alloy substantially consisting of one or more elements that has/have (a) more negative standard potential(s) that iron, is preferably embedded into the hydraulic binder, the binder matrix or the mortar. Especially preferred, the metal or element is zinc, and the metal or alloy is preferably embedded in the form of a grid, net, punched plate or wires. The anode itself may have plate, cube, cylinder or grid form, preferably plate form, and it may be applied, preferably adhered, to a concrete surface or embedded in the concrete.

The inventive metal anode, especially zinc anode, clearly differs from zinc anodes according to the state of the art in the above properties of the inventive binder, especially in the high strength (approximately 15-25 MPa of compressive strength), high elasticity (elastic modulus<15 GPa, preferably <10 GPa), high creep value (>0.25 mm/m) and high ion conductivity. An inventive anode is further characterized in that it can be produced in tile or plate form and be adhered to the construction element to be protected by means of a suitable adhesive, preferably the inventive concrete adhesive, or be inserted as "discrete zinc anode" into the concrete construction element to be protected. An inventive zinc anode may also be produced "in situ" on the construction element to be protected by embedding the metallic zinc on the construction element to be protected into the inventive binder and hardening it to obtain the inventive binder matrix or mortar.

Furthermore, for preventing passivation a zinc anode according to the state of the art requires a binder with high alkalinity, such as described in U.S. Pat. No. 6,572,760 (B2), where a pH of more that 12, preferably more than 14, is described.

Surprisingly, the inventive binder is suitable, especially if it contains a suitable zinc-complexing agent such as a polyethylene imine, for activating zinc anodes, even though the pH value of the inventive binder is only approximately 10.5, as mentioned above. The anodes remain active even after longer use (several years) and are reactivated after dry periods. The activity can be increased considerably by adding LiCl. Experiments have shown that zinc anodes in Portland cement concrete or mortar, even in highly alkaline Portland cement or in Portland cement spiked with alkalis, lose considerable activity after a dry-wet change. The inventive binder is thus also especially suited for the production of "single anodes", also called "discrete anodes", as is e.g. also described in U.S. Pat. No. 6,572,760 (B2).

In order to guarantee long-lasting functioning of the zinc anode, the addition of latently hydraulic aluminosilicates has proven especially effective and advantageous. The zinc anode is sensible to dissolved calcium ions that can be released by the latently hydraulic aluminosilicate glass during hydration. Dissolved calcium ions cause a passivation of the zinc and thus prevent the galvanic corrosion protection of being effective. In the long term, this may lead to an almost complete inefficiency of a galvanic zinc anode. By means of latently hydraulic aluminosilicate additions, the dissolved calcium can be permanently bound in the binder matrix, so that the zinc anode's functioning can be permanently guaranteed.

A precondition for the permanent effectiveness of galvanic zinc anodes is an embedding matrix that is substantially free of dissolved calcium or contains only traces of dissolved calcium. In the inventive binder matrix, optionally dissolved calcium can be bound by adding latently hydraulic aluminosilicates. In contrast to calcium-free hydraulic binders, high strengths, high adhesive tensile strength, and high elasticity can be reached with the inventive calcium-containing binders. This is another substantial precondition for the production of the inventive zinc anodes. The high strengths are due to the integration of calcium into the binder matrix.

A preferred variant of preparing a galvanic zinc anode according to the present invention consists in filling an inventive mortar into a pre-fabricated formwork, e.g. 50×100 cm and 1 cm deep, up to a height of 0.5 cm; a zinc grid, provided with electrical connections, is inserted into this mortar layer, covered with mortar, and thus embedded in the mortar. The plate-like zinc anode thus produced is then bonded to the surface of the construction element to be protected from steel corrosion by aid of a suitable concrete adhesive, preferably an inventive concrete adhesive. After hardening of the adhesive, the individual zinc anode plates are connected to each other and preferably twice within each construction element with the steel reinforcement via the electrical connections.

However, the galvanic zinc anode can also be produced directly on the concrete construction element to be protected by applying a thin inventive mortar layer to the concrete surface. On this mortar layer, e.g. a zinc grid is attached and embedded in a second layer of the inventive mortar.

Depositing the zinc grid and embedding it in an inventive mortar layer on the concrete has, of course, been shown to require high efforts, especially fixing the zinc grid by means of plastic dowels inserted into drill holes and soldering the grids to each other as well as creating the connection to the steel reinforcement. In comparison, bonding plate-like galvanic zinc anodes onto concrete can be done much more easily and quickly. The big advantage of plate-like zinc anodes is that they can be pre-fabricated in a workshop according to their intended use and then be quickly mounted at the construction site, e.g. by analogy with pre-cast concrete parts. In concrete surfaces with complicated structures, e.g. having projections, the in-situ production of the galvanic zinc anode can be easier and cheaper.

One embodiment of the inventive galvanic zinc anode is an anode that is suited for embedment in the concrete construction element. For example, this embodiment may be embedded in consisting concrete construction elements within the framework of concrete repair measures, in order to continuously prevent further corrosion of the steel reinforcement in the border area close to reconstructed concrete. For this application, prism-shaped and cylinder-shaped galvanic zinc anodes have proven especially suitable. The galvanic zinc anode may, however, also be fixed as discrete anode in drill holes in the concrete construction element in a suitable anchor mortar, especially with an inventive concrete adhesive. For this application, again cylinder-shaped galvanic zinc anodes have proven especially suitable.

Experiments with a zinc anode embedded in the inventive hydraulic binder and mounted on a concrete surface showed that, on condition that no fresh water is able to enter (e.g. by sealing the surface with a suitable material, e.g. epoxy resin, PU, PE foil etc.), chloride is galvanically extracted from the concrete cover during the galvanic anode's operation and is chemically bound in the solid electrolyte and entirely immobilized. Scanning electron microscopic studies showed that the chloride is bound as zinc hydroxochloride to the zinc hydroxide produced during galvanic operation and thus entirely immobilized. With 1 kg zinc/m$^2$, 0.56 kg chloride or an equivalent of 5.65% by weight/cement weight can be bound in 3 cm concrete cover. This means that over a longer period, e.g. of approximately 2 to 5 years, chloride can be entirely extracted from the concrete. If renewed entry of chloride is prevented, such a galvanic protection system can be switched off after approximately 5 years or does not need to be renewed after expiration of its active period, which is usually approximately 10 to 15 years.

The galvanic metal anode, especially zinc anode produced according to the present invention is thus especially suited for preventive protection of steel in concrete against corrosion, for which purpose it is preferably embedded in fresh concrete during the manufacture of concrete construction elements. Preferably, the galvanic anode is fixed on the steel reinforcement, electrically connected therewith, and embedded in the fresh concrete together with the steel reinforcement. In a last aspect, the present invention thus comprises the use of such a sacrificial anode for protecting steel, especially steel in reinforced concrete, against corrosion.

In the following, the invention will be described in detail by means of non-limiting examples.

EXAMPLES

Example 1

Component A
14 parts by weight of water
17 parts by weight of blast-furnace slag
10 parts by weight of metakaolin
0.1 parts by weight of cellulose ether
0.1 parts by weight of defoaming agent
60 parts by weight of limestone flour 0.1-1.0 mm
Component B
30 parts by weight of potash water glass
2 parts by weight of potassium hydroxide
Components A and B were each prepared my mixing the ingredients as an aqueous suspension (component A) and a clear solution (component B), respectively. The binder was produced by adding component B to component A. A standard concrete slab (40×40×4 cm) was coated therewith. The mass hardened after 30 minutes. After 24 hours, an adhesive tensile strength of 2 MPa, after 14 days of 2.8 MPa, was measured. The compressive strength after 28 days was 16 MPa, and the static elastic modulus was 10 GPa. The creep value, determined after 90 days, was 0.54 mm/m.

The blast-furnace slag had the following composition:
39 parts by weight of SiO$_2$
6.9 parts by weight of Al$_2$O$_3$
41 parts by weight of CaO
0.4 parts by weight of K$_2$O Example 2

Component A
7 parts by weight of water
15 parts by weight of blast-furnace slag
12 parts by weight of metakaolin
12 parts by weight of a copolymer of butyl acrylate and styrene
  50% aqueous dispersion
0.2 parts by weight of zinc sulfate heptahydrate
0.1 parts by weight of cellulose ether
0.1 parts by weight of defoaming agent
55 parts by weight of limestone flour 0.2-1.0 mm
Component B
25 parts by weight of potash water glass
3 parts by weight of potassium hydroxide
Components A and B were each prepared my mixing the ingredients as an aqueous suspension (component A) and a clear solution (component B), respectively. The binder was produced by adding component B to component A. A standard concrete slab (40×40×4 cm) was coated therewith. The mass hardened after 2 hours. After 24 hours, an adhesive tensile strength of 21.7 MPa, after 14 days of 2.6 MPa, was measured. The compressive strength after 28 days was 18 MPa, and the elastic modulus was 5 GPa. The creep value, determined after 90 days, was 0.35 mm/m.

Example 3

Component A
8 parts by weight of water
18 parts by weight of blast-furnace slag
10 parts by weight of metakaolin
12 parts by weight of a copolymer of butyl acrylate and styrene
  50% aqueous dispersion
0.1 parts by weight of cellulose ether
0.1 parts by weight of defoaming agent
55 parts by weight of limestone flour 0.1-0.3 mm
Component B
28 parts by weight of potash water glass
2 parts by weight of potassium hydroxide
Components A and B were each prepared my mixing the ingredients as an aqueous suspension (component A) and a clear solution (component B), respectively. The binder was produced by adding component B to component A. The binding agent thus produced was especially suited as concrete adhesive and tile adhesive. Applied onto concrete, the adhesive tensile strength after 24 hours was 2 MPa and after 28 days 3 MPa.

Example 4

Component A
8 parts by weight of water
12 parts by weight of blast-furnace slag
16 parts by weight of metakaolin
12 parts by weight of a copolymer of butyl acrylate and styrene
  50% aqueous dispersion
0.5 parts by weight of zinc sulfate heptahydrate 0.1 parts by weight of cellulose ether
0.1 parts by weight of defoaming agent
2 parts by weight of lithium chloride
4 parts by weight of polyethylene imine
55 parts by weight of limestone flour 0.2-1.0 mm
Component B
25 parts by weight of potash water glass
3 parts by weight of potassium hydroxide Components A and B were each prepared my mixing the ingredients as an aqueous suspension (component A) and a clear solution (component B), respectively. The binder was produced by adding component B to component A. Into a formwork of wood (30×30×2 cm), the mortar was filled up to a height of 0.75 cm, a zinc grid (mesh width of 3 cm, wire gage of 1.1 mm) was introduced, and the form was then filled up with the mortar.

Then the zinc anode was bonded to a steel-reinforced concrete slab (40×40×4 cm, 6 mm steel, E 10) with the concrete adhesive and stored in an air-conditioned room at 20° C. and 75% RH. After hardening of the adhesive, the zinc anode was connected with the reinforcing steel. A galvanic initial current of 50 mA/m$^2$ was measured, which decreased over approximately 8 weeks to approximately 8 mA/m$^2$ and remained stable for at least 6 months (5 to 8 mA/m$^2$).

Example 5

Component A
12 parts by weight of water
34 parts by weight of melting-chamber fly ash (vitrified)
15 parts by weight of pozzolan
8.6 parts by weight of polyethyl acetate
    50% aqueous dispersion
0.86 parts by weight of zinc sulfate heptahydrate
0.19 parts by weight of cellulose methyl ether
0.2 parts by weight of defoaming agent
0.9 parts by weight of lithium chloride
1.7 parts by weight of polyethylene imine
Component B
50 parts by weight of potash water glass
5 parts by weight of potassium hydroxide
Component C
80 parts by weight of quartz sand 0.2-0.5 mm The melting-chamber fly ash had the following composition:
  52 parts by weight of $SiO_2$
  12 parts by weight of $Al_2O_3$
  16 parts by weight of CaO
  0.6 parts by weight of $K_2O$ The pozzolan had the following composition:
  65 parts by weight of $SiO_2$
  30 parts by weight of $Al_2O_3$
  5 parts by weight of CaO Components A and B were each prepared my mixing the ingredients as an aqueous suspension (component A) and a clear solution (component B), respectively. The binder was produced by adding component B to component A, and then adding component C. In a cylindrical formwork of plastic (diameter 9.4 cm, height 12 cm), a helical zinc grid (total weight of 170 g) was fixed in the center of the cylinder. Onto the zinc grid, an isolated copper wire (diameter 2.5 mm$^2$) was soldered. The mortar was introduced into the form on a vibrating table, and the form was filled full to the brim. The form was stored at 25° C., stripped after 48 hours, and the form was stored at 99% RH for further 5 days.

The zinc discrete anode thus produced was then introduced into a 10 cm wide and 20 cm deep drill hole, filled with the concrete adhesive of Example 3, in a steel-reinforced concrete slab (30×30×20 cm, 6 mm steel, E 10). After hardening of the adhesive, the copper wire was connected to the reinforcing steel via a measuring device by means of which the current can be measured without resistance. A galvanic initial current of 8 mA was measured, which decreased over approximately 8 weeks to approximately 1.2 mA and remained stable for at least 6 months (5 to 8 mA). Even after several dry/wet cycles, a galvanic current of 0.6 to 0.9 mA was measured after renewed storing in humid atmosphere.

Example 6

Component A
18 parts by weight of water
2 parts by weight of hydrogen peroxide 35%
42 parts by weight of blast-furnace slag of Example 1
10 parts by weight of vitrified hard-coal fly ash
5 parts by weight of polyhexyl acrylate
    50% aqueous dispersion
2 parts by weight of zinc sulfate heptahydrate
0.01 parts by weight of starch ether
0.15 parts by weight of defoaming agent
0.5 parts by weight of lithium chloride
2.1 parts by weight of polyethylene imine
Component B
47 parts by weight of potash water glass
1 parts by weight of potassium hydroxide
Component C
65 parts by weight of quartz sand 0.2-0.5 mm The vitrified hard-coal fly ash had the following composition:
  55 parts by weight of $SiO_2$
  23 parts by weight of $Al_2O_3$
  8 parts by weight of CaO
  0.6 parts by weight of $K_2O$ Components A and B were each prepared my mixing the ingredients as an aqueous suspension (component A) and a clear solution (component B), respectively. The binder was produced by adding component B to component A, and then adding component C. Into a cylindrical formwork of plastic (diameter 9.4 cm, height 12 cm), a helical perforated sheet of a zinc alloy (70% Zn, 30% Al) (total weight of 140 g) was fixed in the center of the cylinder. Onto the zinc grid, an isolated copper wire (diameter of 2.5 mm$^2$) was soldered. The mortar was introduced into the form on a vibrating table, and the form was filled full to the brim. The form was stored at 25° C., stripped after 48 hours, and the form was stored at 99% RH for further 5 days.

The zinc discrete anode thus produced was then introduced into a 10 cm wide and 20 cm deep drill hole, filled with the concrete adhesive of Example 3, in a steel-reinforced concrete slab (30×30×20 cm, 6 mm steel, E 10). After hardening of the adhesive, the copper wire was connected to the reinforcing steel via a measuring device by means of which the current can be measured without resistance. A galvanic initial current of 9 mA was measured, which decreased over approximately 8 weeks to approximately 1 mA and remained stable for at least 6 months (0.5 to 1.0 mA). Even after several dry/wet cycles, a galvanic current of 0.8 to 1.5 mA was measured after renewed storing in humid atmosphere.

The invention claimed is:
1. A hydraulic binder, comprising K, Ca, aluminosilicates, as well as optionally Li, Na, and Mg, wherein said binder comprises the following components:

a) a latently hydraulic aluminosilicate glass with a ratio of $$(CaO+MgO+Al_2O_3)/SiO_2 > 1$$

and b) an alkali activator of the empirical formula (1)

$$a(M_2O)*y(H_2O) \qquad (I)$$

wherein M=Li, Na, K, a=0-4, and x=0-5 and y=3-20,
wherein the molar ratio of Ca/Si is <1, the molar ratio of Al/Si is <1, and the molar ratio of M/Si is >0.1.

2. The hydraulic binder according to claim 1, wherein said alkali activator comprises at lease one alkali hydroxide.

3. The hydraulic binder according to claim 2, wherein said binder is a two-component system, wherein the alkali activator is dissolved in water and the content of the alkali activator and alkali hydroxides optionally contained therein is between 10 and 50% by weight.

4. The hydraulic binder according to claim 1, wherein said binder contains, as a further component c), a latently hydraulic additive that is able to bind calcium ions.

5. The hydraulic binder according to claim 4, wherein said component c) is a low-calcium, latently hydraulic aluminosilicate with a CaO content of <15% by weight.

6. The hydraulic binder according to claim 5, wherein said latently hydraulic aluminosilicate consists of a natural pozzolan, such as volcanic ash or pulverized volcanic tuff.

7. The hydraulic binder according to claim 5, wherein said latently hydraulic aluminosilicate consists of a thermally activated clay mineral calcined between 500° C. and 900° C.

8. The hydraulic binder according to claim 4, wherein said binder contains the components a), b) and optionally c) in the following amounts:
 a) 100-300 parts by weight of latently hydraulic aluminosilicate glass;
 b) 20-150 parts of weight of an alkali activator; and
 c) optionally 50-200 parts by weight of a latently hydraulic additive;
 wherein the molar ratio of Al/Si is <0.8, and the molar ratio of Ca/Si is <0.9.

9. The hydraulic binder according to claim 1, wherein said binder further contains at least one organic polymer.

10. The hydraulic binder according to claim 9, wherein said organic polymer is selected from polyacrylates, latex, polyacryl copolymers, polystyrene copolymers, and polystyrene butadiens.

11. The hydraulic binder according to claim 1, wherein said binder further contains a soluble zinc salt, preferably a zinc sulfate hydrate.

12. The hydraulic binder according to claim 1, wherein said binder further contains a lithium salt, preferably lithium chloride.

13. The hydraulic binder according to claim 1, wherein said binder further contains a zinc-complexing agent, preferably a polyethylene imine or polyamide.

14. The hydraulic binder according to claim 1, wherein said binder further contains a thickening agent and/or and thixotroping agent, preferably a cellulose alkyl ether and/or a starch alkyl ether.

15. The hydraulic binder according to claim 1, wherein said latently hydraulic aluminosilicate glass is mixed with hydrogen peroxide.

16. A binder matrix, produced by use of the hydraulic binder according to claim 1 by reacting the hydraulic binder with water.

17. The binder matrix according to claim 16, wherein said hydraulic binder and water are contained in a ratio of 1:0.5 to 1:4, based on the dry substance of the binder.

18. The binder matrix according to claim 16, wherein the ratio of $CaO/(SiO_2+Al_2O_3)$ is <0.9, the ratio of $CaO/SiO_2$ is <0.9, and the ratio of $M_2O/(SiO_2+Al_2O_3)$ is >0.01.

19. The binder matrix according to claim 18, wherein the ratio of $CaO/(SiO_2+Al_2O_3)$ is <0.3, the ratio of $CaO/SiO_2$ is <0.5, and the ratio of $M_2O/(SiO_2+Al_2O_3)$ is >0.07.

20. A mortar, obtained by use of i) the hydraulic binder according to claim 1, ii) water, and iii) aggregates.

21. The mortar according to claim 20, wherein the ratio aggregates/binder is 1:0.25 to 1:4 and the ratio binder/water is 0.25:1 to 2:1.

22. The mortar according to claim 20, wherein the ratio aggregates/binder is 1:0.5 to 1:2 and the ratio binder/water is 0.25:1 to 2:1.

23. The mortar according to claim 20, wherein the ratio aggregates/binder is 1:0.2 to 1:5 and the ratio binder/water is 0.3:1 to 2, 5:1.

24. A method for manufacturing a concrete adhesive comprising the step of
 providing
 a hydraulic binder according to claim 1,
 a binder matrix, produced by use of the hydraulic binder according to claim 1 by reacting the hydraulic binder with water, or
 a mortar, obtained by use of i) the hydraulic binder according to claim 1, ii) water, and iii) aggregates.

25. A method of manufacturing metal anodes for a galvanic corrosion protection of steel comprising the step of:
 providing one of a hydraulic binder comprising K, Ca, aluminosilicates, as well as optionally Li, Na, and Mg, wherein said binder comprises the following components:
 a) a latently hydraulic aluminosilicate glass with a ratio of $$(CaO+MgO+Al_2O_3)/SiO_2 > 1$$

and b) an alkali activator of the empirical formula (1)

$$a(M_2O)*y(H_2O) \qquad (I)$$

wherein M=Li, Na, K, a=0-4, and x=0-5 and y=3-20,
 wherein the molar ratio of Ca/Si is <1, the molar ratio of Al/Si is <1, and the molar ratio of M/Si is >0.1,
 a binder matrix produced by mixing water with the hydraulic binder, and
 a mortar obtained by use of i) the hydraulic binder, ii) water, and iii) aggregates.

26. The method of claim 25 wherein the steel is in reinforced concrete.

27. The method of claim 25 further comprising the step of embedding the hydraulic binder, the binder matrix, or the mortar with a metal having a more negative standard potential than iron in the electrochemical series or an alloy substantially consisting of at least one element that has a more negative standard potential than iron.

28. The method of claim 27 wherein the metal or element is zinc.

29. The method of claim 27 wherein the metal or alloy is embedded in the form of one of a grid, net punched plate and wires.

30. A galvanic metal anode, comprising:
 at least one metal or at least one metal alloy, embedded in one of the group consisting of a hydraulic binder comprising K, Ca, aluminosilicates, as well as optionally Li, Na, and Mg, wherein said binder comprises the following components:
 a) a latently hydraulic aluminosilicate glass with a ratio of $$(CaO+MgO+Al_2O_3)/SiO_2 > 1$$

and b) an alkali activator of the empirical formula (1)

$$a(M_2O)*y(H_2O) \tag{I}$$

wherein M=Li, Na, K, a=0-4, and x=0-5 and y=3-20, wherein the molar ratio of Ca/Si is <1, the molar ratio of Al/Si is <1, and the molar ratio of M/Si is >0.1, a binder matrix produced by reacting the hydraulic binder with water; and a mortar obtained by use of i) the hydraulic binder, ii) water, and iii) aggregates.

31. The galvanic metal anode according to claim 30 wherein the anode is in the form of one of a grid, net, punched plate and wire.

32. The galvanic metal anode according to claim 30 wherein the metal is zinc.

33. The galvanic metal anode according to claim 30 wherein the anode is in the form of one of a plate, cube, and cylinder.

34. A method of protecting steel against corrosion comprising the step of providing the galvanic metal anode of claim 30.

35. The method as in claim 34 wherein the steel is in reinforced concrete.

\* \* \* \* \*